United States Patent [19]

De'Longhi

[11] Patent Number: 5,339,725
[45] Date of Patent: Aug. 23, 1994

[54] DEVICE FOR EMULSIFYING STEAM AND MILK PARTICULARLY FOR CAPPUCCINOS

[75] Inventor: Giuseppe De'Longhi, Treviso, Italy
[73] Assignee: Miralfin S.R.L., Treviso, Italy
[21] Appl. No.: 87,516
[22] Filed: Jul. 2, 1993
[30] Foreign Application Priority Data
 Oct. 30, 1992 [IT] Italy .................... MI92 U 000947
[51] Int. Cl.$^5$ ............................................. A47J 31/40
[52] U.S. Cl. .................................. 99/293; 99/323.1; 261/DIG. 76
[58] Field of Search ............. 99/293, 279, 294, 323.1, 99/323.3; 261/121.1, DIG. 76; 426/433

[56] References Cited
U.S. PATENT DOCUMENTS

| | | | |
|---|---|---|---|
| 4,852,474 | 8/1989 | Mahlich | 99/293 |
| 4,945,824 | 8/1990 | Borgmann | 99/293 |
| 4,960,042 | 10/1990 | Grossi | 261/DIG. 76 |

Primary Examiner—Robert W. Jenkins
Attorney, Agent, or Firm—Herbert Dubno

[57] ABSTRACT

The device for emulsifying steam and milk particularly for cappuccinos and the like includes a first duct and a second duct for conveying milk and steam respectively and a device for mixing and emulsifying the milk with the steam; the mixing and emulsifying device is formed by a single chamber which is connected to the atmosphere and is provided with an element for conveying the first duct into the second duct for the simultaneous delivery, from a single outlet of the conveyance element, of milk and steam at a preset distance from the bottom of the chamber.

12 Claims, 2 Drawing Sheets

DEVICE FOR EMULSIFYING STEAM AND MILK PARTICULARLY FOR CAPPUCCINOS

FIELD OF THE INVENTION

The present invention relates to a device for emulsifying steam and milk particularly for cappuccinos.

BACKGROUND OF THE INVENTION

It is known that milk is emulsified, in order to obtain cappuccinos and the like, by immersing the steam dispensing spout, for example of a coffee machine, in the milk contained in a vessel.

The steam injected into the milk heats it and simultaneously entraps air particles which produce the typical froth of cappuccinos.

Obtainment of an abundant froth is thus entrusted to the skill of the operator, since if the spout were to be insufficiently immersed in the milk the steam which leaves the spout would produce dangerous spurts without allowing the forming of froth; on the other hand, excessive immersion of the spout in the milk would cause excessive heating thereof, causing any emulsion to flop and at the same time preventing the entrapment in the milk of the air particles required to form the froth.

Furthermore, the high temperature reached by the steam delivery spout, since the spout is usually made of metal, burns the milk on its internal and external surfaces, thus forcing the operator to clean it frequently both for the sake of hygiene and to avoid the partial or total obstruction of its channel.

OBJECTS OF THE INVENTION

The principal object of the present invention is to provide an apparatus overcoming the problems of the known art.

Within the scope of this aim, an important object of the invention is to provide a device for emulsifying steam and milk particularly for cappuccinos and the like which allows the forming of abundant froth independently of the skill with which the operator performs this operation.

Yet another object of the present invention is to provide a device for emulsifying steam and milk which can be easily cleaned and inspected so as to allow the elimination of any milk residues from its surfaces.

A further object of the present invention is to provide a device for emulsifying steam and milk which avoids any burning of the milk on the walls of the steam dispensing spout.

Still another object of the invention is to provide a device for emulsifying steam and milk which is simple to manufacture, has a modest cost and can furthermore be applied, without particular modifications, to any coffee-making machine.

SUMMARY OF THE INVENTION

These objects are achieved by a device for emulsifying steam and milk, particularly for cappuccinos and the like, which includes a first duct and a second duct for the conveyance of milk and steam and a means for mixing and emulsifying the milk with steam, characterized in that the mixing and emulsifying means is formed by a single chamber which is connected to the atmosphere and is provided with an element for conveying the first duct into the second duct for the simultaneous delivery, from a single outlet of the conveyance element, of said milk and said steam at a preset distance from the bottom of the chamber.

BRIEF DESCRIPTION OF THE DRAWING

The above and further objects, characteristics and advantages will become more apparent from the following description, references being made to the accompanying drawings, wherein.

SPECIFIC DESCRIPTION

Figure 1:
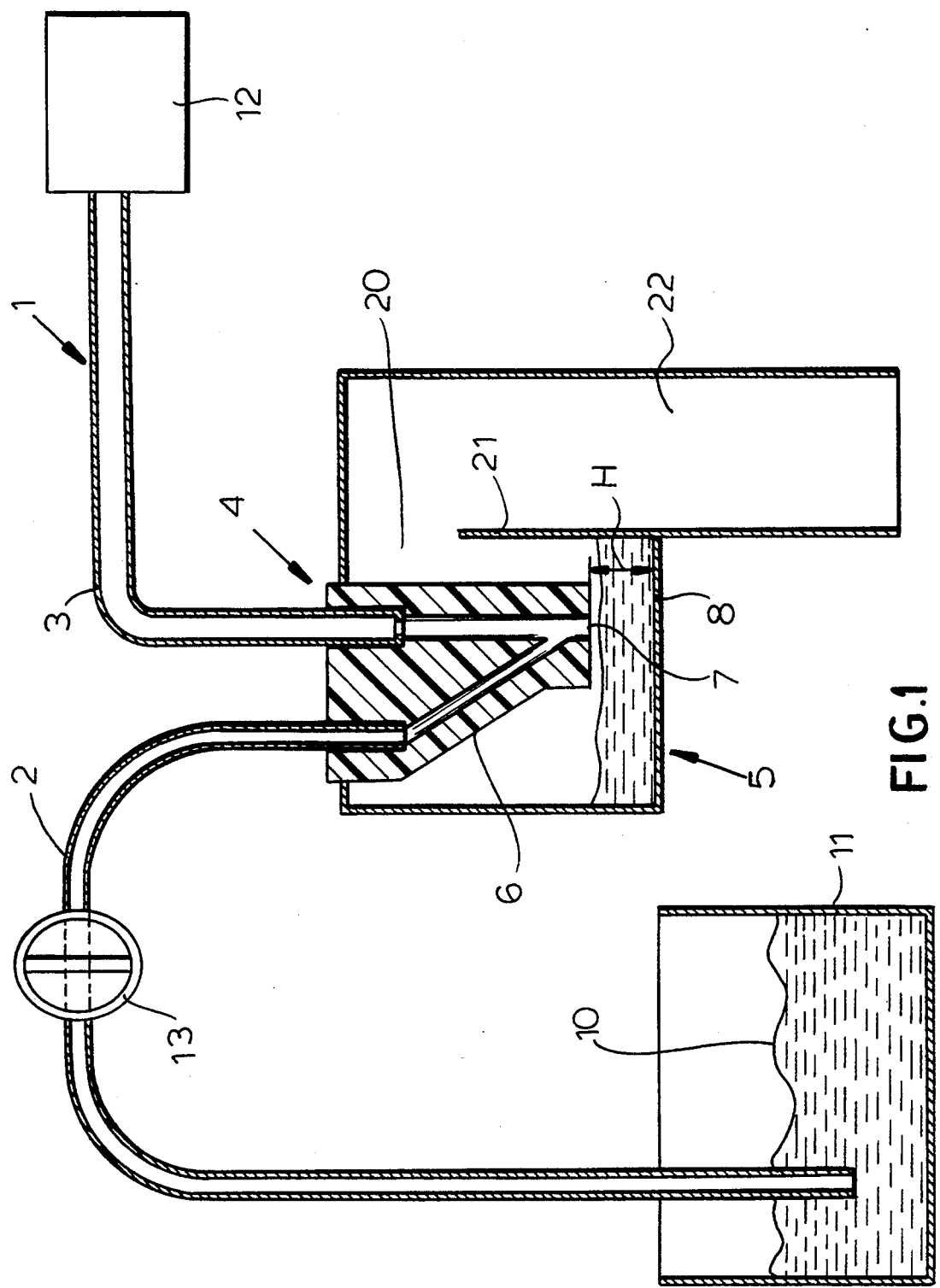
FIG. 1 is a schematic and transversely sectional lateral elevation view of the device for emulsifying steam and milk according to the invention.

With particular reference to the above figures, the device according to the invention, generally designated by the reference numeral 1, includes a first duct 2 and a second duct 3 which are respectively suitable to convey milk and steam to a means, generally designated by the reference numeral 4, for mixing and emulsifying the milk with the steam.

Advantageously, the mixing and emulsifying means 4 is formed by a single chamber, generally designated by the reference numeral 5, which is connected to the atmosphere and to which a conveyance element 6 is connected; said conveyance element allows the first duct 2 to merge into the second duct 3 and obtain the simultaneous delivery, from a single outlet 7 of the conveyance element 6, of the milk and of the steam at a preset distance "H" from the bottom 8 of the chamber 5.

Particularly, the first duct 2 merges into the second duct 3 proximate to the outlet 7 with an angle from 15 to 45 degrees.

It is critical thererfore that the first duct 2 has a smaller diameter than the second duct 3 for the conveyance of steam.

By virtue of the above, the flow of steam in the second duct 3 produces a partial vacuum which is suitable to draw, through the first duct 2, the milk 10 contained inside a container 11.

In this manner, every time the steam generator 12 is activated, the flow of steam through the duct 3 draws the milk 10 from the container 11 in a preset amount by virtue of the presence of a draft regulator 13 which can be for example a tap for the complete opening or partial and complete closure of the duct 2.

Variation in the passage section of the draft regulator 13 allows to vary the amount of milk drawn from the container 11 according to the type of froth (abundant or scarce) to be obtained when emulsifying the milk with the steam.

Obviously, to prevent the milk from continuing to flow inside the duct 2 once the flow of steam inside the duct 3 has ceased, the container 11 and particularly the inlet of the duct 2 must be at a lower level than the bottom 8 of the chamber 5.

Figure 2:
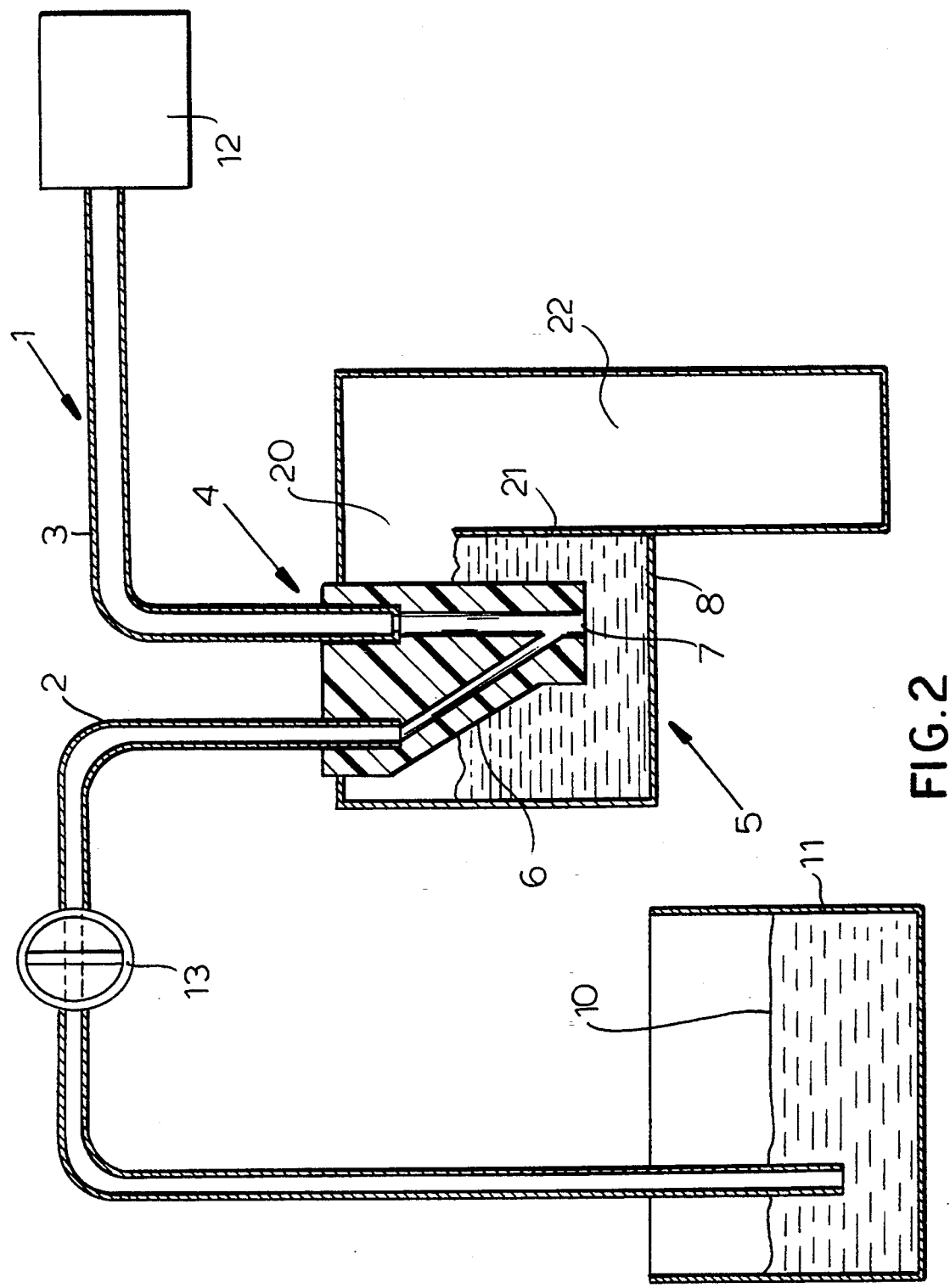
FIG. 2 is a view of the device shown in FIG. 1 during the milk and steam emulsification step, with the associated forming of froth.

As shown in FIGS. 1 and 2, the chamber 5 is connected to the atmosphere by means of an opening 20 which is formed on a lateral wall 21 thereof and is spaced from the bottom 8 of the chamber 5.

In other words, due to reasons which will be better specified hereinafter, the outlet 7 is, as mentioned, at a distance "H" from the bottom 8 which is less than the distance of the initial portion of the opening 20 from the bottom.

Finally, two characteristics must be stressed.

The first characteristic is related to the fact that the conveyance element 6 is advantageously made of plastic material, so that it can be associated in a removable manner, so as to form a seal, with the ends of the first duct 2 and of the second duct 3 and so as to simultaneously prevent the propagation of the heat of the duct 3 to the milk conveyance duct 2, thus avoiding the forming, on the internal and external surfaces of the duct 2, of films or particles of burnt milk which might obstruct it and are furthermore scarcely hygienic.

In the same manner, the outlet 7, being made of plastic material, is not affected by the high temperature reached by the duct 3 and is therefore equally free from the drawbacks of spouts according to the known art.

The second characteristic to be stressed is the fact that the opening 20 is connected to a channel 22 through which the milk, steam and froth emulsion can be injected into the coffee which is present in a cup, not shown in the drawings, to provide a so-called cappuccino.

The operation of the device according to the invention is evident from what has been described and illustrated.

In particular, with reference to FIG. 1, it can be seen that as steam flows inside the duct 3, milk 10 is simultaneously drawn from the container 11 and delivered, together with the steam, from a single outlet 7 which is present on the conveyance element 6.

So long as the level of the milk and of the steam inside the chamber 5 remains (as shown in FIG. 1) lower than the level "H" of the outlet 7, only a mixing operation is obtained, i.e. the milk is heated and the steam condenses.

When the level of the mixture formed by the milk and the condensed steam reaches the level of the outlet 7, the emulsion step begins, in other words, a large number of air particles, suitable to form the required froth, is entrapped in the mixture of milk and condensed steam.

The level of the milk and steam emulsion rises inside the chamber 5 until it overflows from the wall 21 inside the channel 22.

It is stressed that the height of the wall 21 is preset so that the emulsion can overflow into the channel 22 after a specific time interval, i.e. before the milk overheats excessively, causing the emulsion to flop with the consequence of obtaining merely hot milk with no froth.

It should also be added that by closing the draft regulator 13 completely, steam alone can be produced, for example to heat beverages; or, vice versa, by opening the draft regulator 13 completely in practice one obtains just warm milk substantially without the forming of froth.

In practice it has been observed that the device according to the invention is particularly advantageous for various reasons.

First of all, the device according to the invention is enormously flexible in use, since it can be used as steam dispenser, as fluid heater, or as emulsifying device for forming the froth of a cappuccino.

In addition to the above, the structure is extremely simple and compact and can be inspected and cleaned completely, thus ensuring high characteristics of hygiene and operation.

In practice, the materials employed, as well as the dimensions, may be any according to the requirements and the state of the art.

I claim:

1. A coffee machine, particularly for making cappuccino, comprising:
    a steam duct for passing steam along a path formed with an outlet;
    milk supplying means for carrying milk and including a milk duct;
    a conveying element channeling milk along a milk path from said milk duct to said steam duct and having a downstream end mounted sealingly on said steam duct and opening thereinto upstream from said outlet, so that milk is drawn into said steam duct upon injecting steam; and
    receptacle means for receiving a mixture of said milk and steam from said outlet and including a chamber, said chamber having a bottom spaced from said outlet at a preset distance and being in air communication with the atmosphere.

2. The coffee machine defined in claim 1 wherein said conveying element is inclined with respect to a vertical and opens into said steam duct immediately upstream form said outlet.

3. The coffee machine defined in claim 2 wherein said steam duct and conveying element form an angle of 15° to 45° therebetween.

4. The coffee machine defined in claim 1 wherein said conveying element is removably mounted on said ducts.

5. The coffee machine defined in claim 1 wherein said steam duct is formed with a diameter larger than a diameter of said conveying element.

6. The coffee machine defined in claim 1 wherein said receptacle means further comprises:
    an opening formed in the periphery of said chamber and spaced from said bottom at a distance larger than a distance between said bottom and said outlet, said mixture of milk and steam being emulsified upon emerging of said outlet in the mixture filling said chamber, and
    conduit means connected with said opening for exiting said mixture emulsified in said chamber.

7. The coffee machine defined in claim 1 wherein said steam and milk ducts are made of plastic material.

8. The coffee machine defined in claim 1, further comprising steam generating means for jet pumping steam along said steam duct and for forming a partial vacuum in the vicinity of the downstream end of said conveying element.

9. A coffee machine, particularly for making cappuccino, comprising:
    a steam duct for supplying steam along a path formed with an outlet;
    milk supplying means for carrying milk and including a milk duct;
    a conveying element connecting said milk and steam ducts and opening into said steam duct upstream from said outlet for delivering milk thereinto from said milk duct;
    receptacle means for receiving a mixture of said milk and steam from said outlet and including a chamber, said chamber having a bottom spaced from said outlet at a preset distance and being in air communication with the atmosphere; and
    a regulator means connected with said milk supplying means for controlling milk flow through said milk duct.

10. The coffee machine defined in claim 9, further comprising a milk reservoir formed with a top extending at most to a level of a bottom of said chamber.

11. The coffee machine defined in claim 9 wherein said conveying element is sealingly removably mounted on said steam duct.

12. A coffee machine apparatus, particularly for making cappuccino, comprising:

a steam duct for injecting steam along a path formed with an outlet;

milk supplying means for carrying milk and including a milk duct;

a conveying element channeling milk along a milk path from said milk duct to said steam duct and having a downstream end mounted sealingly on said steam duct and opening thereinto upstream from said outlet, so that milk is drawn into said steam duct upon injecting steam; and receptacle means for receiving a mixture of said milk and steam from said outlet, said receptacle means including:

a chamber having a bottom spaced from said outlet at a preset distance and being in air communication with the atmosphere, an opening formed on a peripheral wall of said chamber and spaced from said bottom by a distance larger than a distance between said bottom and said outlet, said mixture of milk and steam being emulsified upon emerging from said outlet into the mixture filling said chamber, and conduit means connected with said opening for discharging said mixture emulsified in said chamber.

* * * * *